United States Patent [19]
Gaiser

[11] Patent Number: 6,021,091
[45] Date of Patent: Feb. 1, 2000

[54] METHOD FOR MANUFACTURING A SEISMIC CABLE

[75] Inventor: James E. Gaiser, Littleton, Colo.

[73] Assignee: Western Altas International, Inc., Houston, Tex.

[21] Appl. No.: 09/234,334

[22] Filed: Jan. 20, 1999

[51] Int. Cl.[7] .................................................. G01V 1/38
[52] U.S. Cl. ................................................. 367/20; 367/15
[58] Field of Search ............................. 367/20, 24, 165, 367/15; 340/17

[56] References Cited

U.S. PATENT DOCUMENTS

| | | | |
|---|---|---|---|
| 3,786,410 | 1/1974 | Hazelhurst | 340/17 |
| 3,794,965 | 2/1974 | Charske | 340/7 PC |
| 3,866,162 | 2/1975 | Florian | 340/17 |
| 4,078,223 | 3/1978 | Strange | 340/7 R |
| 4,253,164 | 2/1981 | Hall, Jr. | 367/63 |
| 4,319,347 | 3/1982 | Savit | 367/52 |
| 4,536,862 | 8/1985 | Sullivan et al. | 367/153 |
| 4,649,530 | 3/1987 | Porter, Jr. | 367/154 |
| 4,694,436 | 9/1987 | Gelfand | 367/20 |
| 5,729,506 | 3/1998 | Dragoset, Jr. et al. | 367/24 |
| 5,781,510 | 7/1998 | Chang et al. | 367/188 |
| 5,828,570 | 10/1998 | Gaiser | 364/422 |
| 5,867,451 | 2/1999 | Chang et al. | 367/165 |

OTHER PUBLICATIONS

Sea Mux Corp, The Sea MUX 2000–24 Digitizing Module [http:// seamux.com/products/seamux, Jun. 6, 1997.
Geo Space Corp, The sea array–3, and 3–D imaging cables. [http:www.geospacecorp.com], Jan. 15, 1995.

*Primary Examiner*—Christine K. Oda
*Assistant Examiner*—Victor Taylor
*Attorney, Agent, or Firm*—Alan J. Atkinson

[57] ABSTRACT

Ocean bottom seismic cables are subject to rolling motions due to seismic wave fields and current action which cause poor receiver ground-coupling and signal distortion, particularly along the cross-line and vertical axes. Two multi-axial receivers are mounted on opposite sides of the cable in a single cluster. When the cable rolls, the axial response of one receiver of the cluster cancels the axial response of the other receiver of that cluster.

15 Claims, 2 Drawing Sheets

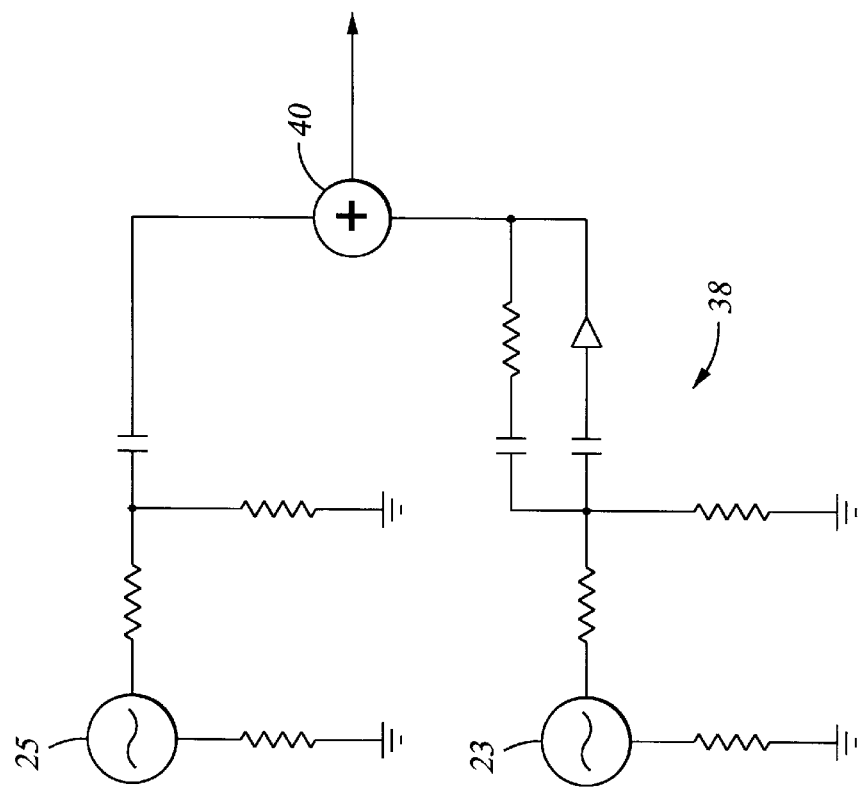
Fig. 5
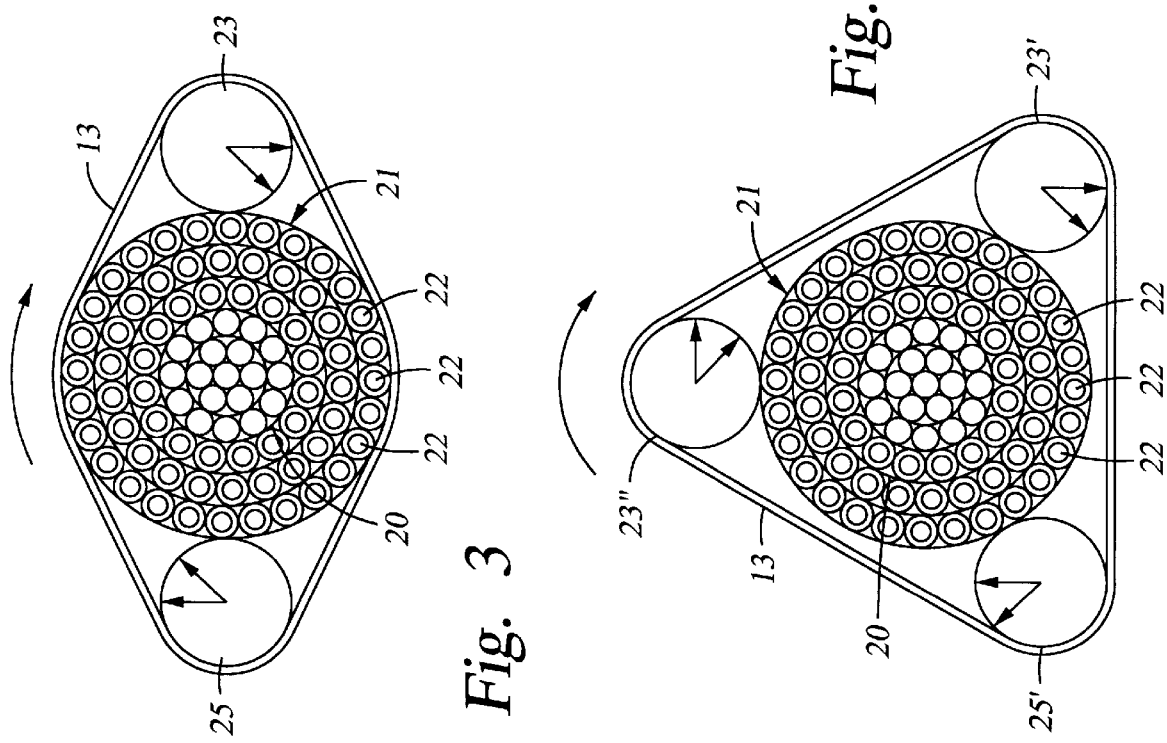
Fig. 3
Fig. 4

METHOD FOR MANUFACTURING A SEISMIC CABLE

BACKGROUND OF THE INVENTION

1. Field of the Invention

This is a method for manufacturing a cable for use in seismic exploration. The cable is designed to include along its length, spaced-apart clusters of multi-axis geophones. Each cluster includes at least two multi-axis geophones that are secured to opposite sides of the cable. Seismic signals resulting solely from cable rotation about its in-line axis, are expected to cancel.

2. Discussion of Relevant Art

As is well known to geophysicists, in the conduct of a seismic survey, a sound source, at or near the surface of the earth, is caused periodically to inject an acoustic wavefield into the earth at each of a plurality of regularly-spaced survey stations. The wavefield radiates in all directions to insonify the subsurface earth formations whence it is reflected back to be received by seismic sensors (receivers) located at designated stations at or near the surface of the earth. The seismic sensors convert the mechanical earth motions, due to the reflected wavefields, to electrical signals. The resulting electrical signals are transmitted over a signal-transmission link of any desired type, to instrumentation, usually digital, where the seismic data signals are archivally stored for later processing. The travel-time lapse between the emission of a wavefield by a source and the reception of the resulting sequence of reflected wavefields by a receiver, is a measure of the depths of the respective earth formations from which the wavefield was reflected.

The seismic survey stations of a 3-D survey are preferably distributed over a regular grid (preferably rectangular) of intersecting lines of survey over an area of interest. The inter-station spacing is on the order of 25 meters. Every station is preferably occupied by a seismic receiver; the acoustic-source spacing is usually an integral multiple of the receiver-station spacing.

The seismic receivers transmit data to the preferred instrumentation by data communication channels that are contained within a seismic cable which may be tens of kilometers long. Because of their great length, a seismic cable is usually made in sections, each about 100 meters long. Each end of a section is provided with a connector for providing mechanical and data-communication linkage between the desired plurality of sections. The data transmission channels in the cable may be electrical, over wire lines, or optical, via optical fibers, analog or digital, multiple-channel or multiplexed single-channel.

Acoustic wavefields propagate through the earth in various modes. Of interest are compressional waves and shear waves. Compressional waves are polarized in-line outwardly away from the source. Shear waves are polarized horizontally both in-line and cross-line directions. Therefore, when all three wavefields are of interest in a survey, multi-component receivers are used. For such surveys, each receiver package includes a three-component (tri-axial) receiver: a vertically-polarized receiver responsive to compressional wavefields and two shear-wave receivers that are polarized horizontally in the in-line and the cross-line directions respectively.

Three-component receivers are customarily provided in a single cylindrical package which may be mechanically coupled to the seismic cable at desired intervals. The receiver signal output terminals are linked to the data transmission channels. With particular reference to ocean bottom cables (OBC), the respective multi-component receiver packages are usually integrated directly into the cable.

Seismic cables are cylindrical. In shallow water, on the bottom, sea currents cause the elongated cable to roll slightly around its in-line or longitudinal axis. Any wavefield that has a polarization component in the cross-line direction can cause the cable to oscillate slightly around its in-line axis. The in-line receiver is not affected but the cable-rolling motion introduces severe noise to the signals originating from the cross-line and the vertically-polarized receivers.

Although several mathematical data-processing techniques are known for reducing signal distortion due to poor ground coupling, those techniques are not completely satisfactory. Since there is no practical way to physically prevent ocean-bottom cable movement, there is a need for a method for manufacturing an OBC cable that will inherently provide noise cancellation ab initio in the presence of undesired cable motions.

SUMMARY OF THE INVENTION

An elongated ocean-bottom seismic cable section of a desired length is manufactured by assembling a stress member in combination with a plurality of signal communication channels. A plurality of receiver clusters are fastened to the assembly at desired intervals. Each cluster includes at least two multi-axial, gimbal-supported seismic receivers which are symmetrically mounted about the axis of the cable assembly. Output signals from the common axes of the respective multi-axis receivers of each cluster are coupled with each other through a suitable filter and linked to corresponding signal communication channels. The cable section is terminated by connectors for providing mechanical and communication linkage to other sections and eventually to signal-processing instrumentation.

In an aspect of this invention, the entire assembly, including stress member, communication channels and seismic receivers is sheathed in a fluid-impermeable skin.

In another aspect of this invention, each cluster includes N triaxial seismic receivers secured at 360°/N intervals around the perimeter of the cable section.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 3 is a cross section showing the disposition of a cluster of two multi-axial seismic receivers as mounted on an OBC;

FIG. 4 is a cross section showing the disposition of a cluster of three multi-axial seismic receivers as mounted on an OBC;

FIG. 5 is an electrical analog equivalent of a digital filter which may be used for matching the output signals from corresponding axes of a cluster of two or more multi-axial seismic receivers.

DETAILED DESCRIPTION OF THE PRESENTLY-PREFERRED EMBODIMENT

Figure 1:
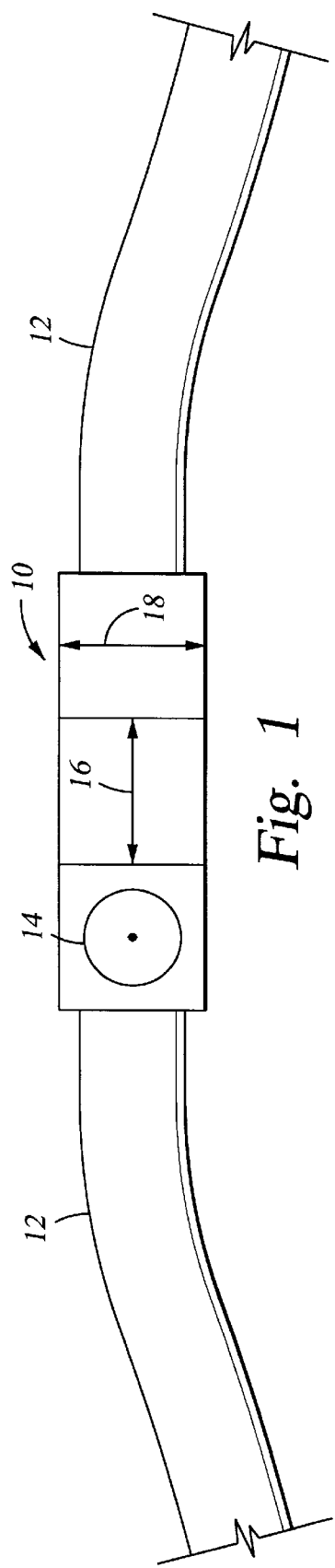
FIG. 1 is a schematic diagram of a multi-axis seismic receiver coupled to a seismic cable such as an ocean bottom cable (OBC)

FIGS. 1–4 are not to scale. FIG. 1 is a schematic side view of a three-axis receiver 10 secured to an ocean bottom cable (OBC) 12. A multi-axis receiver 10 of any well-known type, includes a cross-line motion-responsive axis 14, in-line motion-responsive axis 16, and a vertical motion-responsive axis 18, all mounted on gimbals in a single case. This invention may be applied to either land or marine operations but for purposes of example only and not by way of limitation, this disclosure will be discussed in terms of an OBC.

Figure 2:
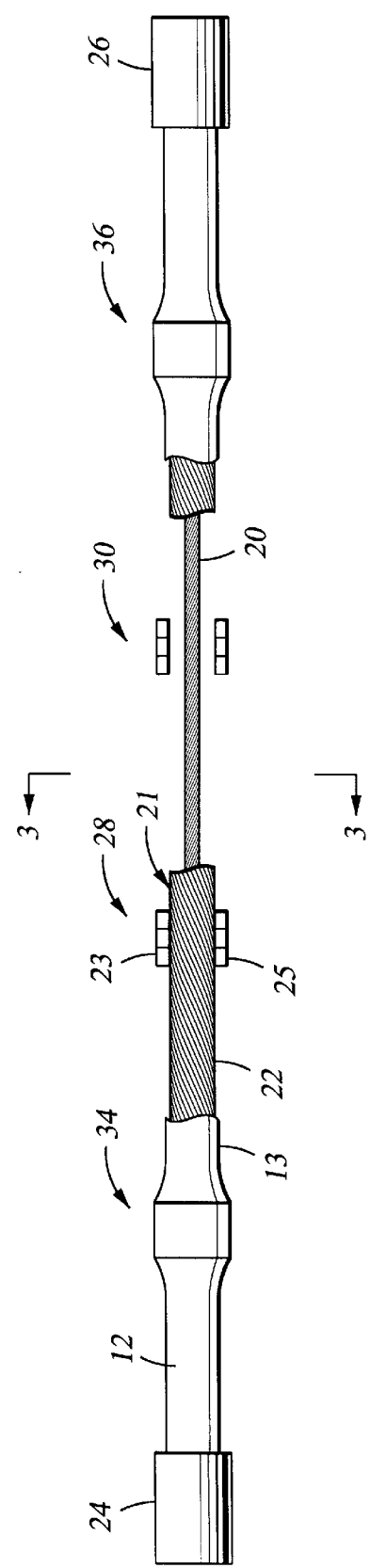
FIG. 2 is a cross section showing schematically the internal construction of an OBC section.

FIG. 2 is a top view of an OBC section 12 with a portion of a fluid-impermeable protective sheath 13 cut away to show the internal construction. An OBC section may be manufactured by providing a stress member, 20 of any desired type. Signal communication channels such as electrical wire lines or optical fibers, generally shown as 22 are associated with the stress member 20, such as by wrapping as shown, to form a cable carcass 21. Each end of OBC 12 is anchored to and terminated by a connector of any well-known type such as 24 and 26 to provide mechanical and signal communication linkage with the other additional sections as needed in sufficient number to make up an OBC of the required length. The OBC is coupled to signal storage and processing equipment of any conventional type (not shown).

Clusters, each including at least two multi-axis seismic receivers such as 23 and 25 are secured on each side of the cable section at preferred spatial intervals such as 25 meters. Two clusters 28 and 30 are shown where the outer sheath 13 has been cut away; two more clusters, covered by the fluid-impermeable outer sheath 13, create bulges at 34 and 36. Signal output lines (not shown) from each receiver axis may be connected directly to an appropriate signal communication channel or the output lines may be interrupted by insertion of a matching filter to be described later. Although the receivers of a cluster could be strapped externally to each side of the finished OBC, it is preferred that the receivers such as 23 and 25 that make up receiver clusters such as 28 and 30, be secured to the cable carcass 21 and then enclosed by the sheath 13 when the sheath is extruded over the cable carcass 21. By that means, the cable is less likely to be snagged during deployment.

FIG. 3 is a cross section along line 3—3 of FIG. 2, showing the mode of association of the receivers such as 23 and 25 held in place around carcass 21 by sheath 13. The short arrows indicate possible motion response vectors of the cross-line and vertical axes of each receiver such as could be caused by rolling motion of the cable to the right. A downward/left-diagonal motion felt by receiver 23 will ideally cancel an upward/right-diagonal motion felt by receiver 25. The in-line components of each receiver are unaffected and so are not shown.

FIG. 4 is the arrangement of the receivers when N=3 multi-component receivers 23', 23", 25' are used. If N receivers are used, where N>3, the receivers would then be symmetrically distributed around the perimeter of the carcass or cable at 360°/N angular intervals.

Despite careful manufacturing tolerances, it has often been found that two seismic receivers, when coupled together with opposite polarity, will not exactly cancel a signal due to the same mechanical stimulus because the transfer functions of the respective receivers are not identical. Therefore, in the manufacture of the cable 12 and referring now to FIG. 5, a transfer-function shaping filter 38 (not shown in FIG. 2) is included for matching the signal responses of each of the axes of one of the receivers to corresponding, commonly-polarized axes (i.e., cross-line to cross-line, vertical to vertical) of the other receiver(s) as shown in FIG. 5. Each axis has its own filter. One such filter is described in U.S. Pat. No. 4,253,164, issued Feb. 24, 1981 to Ernest M. Hall and assigned to a predecessor firm of the assignee of this invention and which is incorporated herein by reference. The filter circuit 38 is conventional and is shown for illustrative purposes only. It is designed to match the impulse responses of the commonly-polarized axes of one of the two or more receivers such as 23 to that of the other receiver 25 in frequency, phase, amplitude and damping and to then combine their output signals as by adder 40, FIG. 5. The combined output signals are coupled to a selected one of the signal communication channels in any well-known manner. The filter shown in FIG. 5 is an analog filter. It would be preferable to provide an equivalent digital filter using firmware such as an IC microprocessor of any well known type that can be mounted in the instrument module containing the receiver cluster. The filtering could, of course be applied using software during the data-processing stage of the seismic signals.

The seismic-receiver output signals are customarily analog. The signals may be transmitted to the data-processing equipment in analog form or the signals may first be digitized by analog-to-digital modules. Such modules are often integrated with the section terminations such as 24 and 26 or made a part of the receiver clusters, all of which techniques are well known to the art.

This invention has been described with a certain degree of specificity by way of example but not by way of limitation. Those skilled in the art will devise obvious variations to the examples given herein but which will fall within the scope of this invention which is limited only by the appended claims.

It is very well known to use arrays or nests of multiple receivers of the uni-axial type to statistically cancel noises having random origins and to reinforce signals traveling along a preferred trajectory. But the problem of compensating for rotational disturbances associated with specific wavefield propagation modes using multi-axis receivers is not believed to have been previously addressed.

Throughout this disclosure, it has been implied that the multi-axis receivers include three components each. Inasmuch as the in-line component is unaffected by cross-line-rolling cable motion, the second and/or third receiver of a cluster could well be a two-axis instrument retaining only the vertically- and cross-line-responsive axes. That arrangement would result in a modest savings in original instrumentation cost. Furthermore, even if it turns out to be inconvenient to stock two different kinds of seismic receiver, transmission channels dedicated to the in-line signals from the second receiver could be eliminated, thus providing a savings in the cost of the cable carcass.

A similar arrangement may be used to handle rotational disturbances around the vertical or the cross-line axes if desired.

What is claimed is:

1. A method for manufacturing a seismic cable section having a stress member in combination with a plurality of signal communication channels to form a carcass, the method comprising the steps of:

fastening multiple receiver clusters to the carcass at desired intervals, wherein each receiver cluster comprises at least two multi-axial, seismic receivers symmetrically disposed around the perimeter of the carcass for receiving seismic data and for generating output signals representing commonly-polarized axes;

installing a filter in association with each said receiver cluster for receiving, matching and combining the transfer characteristics of said output signals from commonly-polarized axes of the multi-axis receivers in each cluster;

providing a signal-communication channel for introducing the combined output signals from each axis into said selected communication channel.

2. The manufacturing method as defined by claim 1, further comprising the step of sheathing the entire assembly, including stress member, communication channels, transfer-function matching circuit and multi-axis receivers with a fluid-impermeable skin.

3. The manufacturing method as defined by claim 2, further comprising the step of forming each cluster of multi-axis seismic receivers from three, triaxial seismic receivers secured at 120 degree intervals around the perimeter of the carcass.

4. A method for manufacturing a seismic cable section having a stress member in combination with a plurality of signal communication channels to form a carcass, the method comprising the steps of:

fastening a plurality of receiver clusters to the carcass at desired intervals, wherein each receiver cluster comprises at least two multi-axial, seismic receivers symmetrically mounted on opposite sides of the carcass for receiving seismic data and for generating output signals representing commonly-polarized axes;

providing a signal transmission channel for introducing output signals from each axis of the receivers making up each cluster into selected communication channels.

5. The method as defined by claim 4, further comprising the steps of interconnecting a signal response-matching filter between commonly-responsive axes of said cluster for matching the signal transfer functions of the output signals and of combining the matched outputs.

6. The method as defined by claim 5, further comprising the step of mounting N multi-axis seismic receivers at 360 degrees/N angular intervals around the carcass.

7. An elongated seismic cable-section assembly insensitive to cross-line rotational disturbances, the assembly including a stress member associated with a plurality of signal communication channels to form a carcass, comprising:

a plurality of receiver clusters secured to said carcass at selected intervals along said cable section, each said cluster including at least two multi-axis seismic receivers symmetrically disposed circumferentially around the carcass for receiving seismic data and for generating output signals representing commonly-polarized axes; and a filter having inputs in signal communication with said at least two multi-axis receivers for matching the respective response characteristics of signals emanating from commonly-polarized axes in amplitude, phase, frequency response and damping, wherein the filter has an output for combining the matched responses of said multi-axis receivers and for introducing the combined matched response to a selected communication channel.

8. An assembly as recited in claim 7, further comprising a fluid impermeable sheath for covering the entire cable-section assembly between said cable termination means.

9. A method for detecting seismic data, comprising the steps of:

deploying a cable base formed with a stress member, a plurality of signal communication channels, and multiple receiver clusters each having at least two multi-axial, seismic receivers symmetrically disposed around the perimeter of said cable base for receiving seismic data and for generating output signals representing commonly-polarized axes;

filtering each receiver cluster to receive, match and combine transfer characteristics of said output signals; and providing a signal-communication channel for introducing the combined output signals from each axis into said selected communication channel.

10. A method as recited in claim 9, further comprising the step of filtering each receiver cluster with a digital filter.

11. A method as recited in claim 9, wherein the output signal from each multi-axial seismic receiver is transmitted through a selected communication channel before each output signal is filtered and combined.

12. A method as recited in claim 9, wherein said cable base comprises an ocean bottom cable.

13. A method as recited in claim 9, wherein said combined output signals from each axis compensates for rotational disturbances of said multi-axial seismic receivers.

14. A method as recited in claim 13, further comprising the step of retaining output signals regarding only the vertically and cross-line responsive axes.

15. A method as recited in claim 9, further comprising the step of forming a fluid impermeable sheath around said cable base, communication channels and receiver clusters.

\* \* \* \* \*